US006749438B1

(12) United States Patent
Scheller et al.

(10) Patent No.: US 6,749,438 B1
(45) Date of Patent: Jun. 15, 2004

(54) TOWING CONNECTOR (75) Inventors: Daniel L. Scheller, Emporia, KS (US);
David H. Ihde, Osage City, KS (US)

(73) Assignee: Hopkins Manufacturing Corporation, Emporia, KS (US)

( * ) Notice: Subject to any disclaimer, the term of this patent is extended or adjusted under 35 U.S.C. 154(b) by 74 days.

(21) Appl. No.: 10/443,874

(22) Filed: May 22, 2003

(51) Int. Cl.[7] ............................................. H01R 33/00
(52) U.S. Cl. ......................... 439/35; 439/638; 439/639
(58) Field of Search ........................... 439/34, 35, 638,
439/680, 352, 654, 639

(56) References Cited

U.S. PATENT DOCUMENTS

| 4,179,179 | A | * | 12/1979 | Lowden | 439/278 |
| 4,299,434 | A | * | 11/1981 | Ishikawa | 439/394 |
| 4,775,802 | A | * | 10/1988 | Dods | 307/147 |
| 5,354,204 | A | * | 10/1994 | Hughes | 439/35 |
| 5,443,389 | A | * | 8/1995 | Hughes | 439/35 |
| 5,601,451 | A | * | 2/1997 | Driones et al. | 439/490 |
| 5,626,479 | A | * | 5/1997 | Hughes | 439/35 |
| 6,447,302 | B1 | * | 9/2002 | Davis | 439/34 |

* cited by examiner

*Primary Examiner*—Tho D. Ta
(74) *Attorney, Agent, or Firm*—Hovey Williams LLP (57) ABSTRACT

An electrical interface device (210) is provided for disengageable or removable coupling with an existing master connector substantially non-removably mounted on a towing vehicle in order to allow for the connection of the electrical systems of differently configured towed vehicles without any modification of the device (210). The device (210) comprises a first end (218a) presenting a first master connector (222) and a second master connector (224), and a second end (218b) presenting a third interface connector (225). An alignment mechanism (229) ensures proper alignment, and a locking mechanism (231) avoids inadvertent uncoupling of the device (210) from the existing master connector. In use, the second end (218b) of the device (210) is coupled with the existing master connector, and an electrical connector of the towed vehicle is coupled with the first or second master connectors (222,224), thereby slaving the electrical system of the towed vehicle to that of the towing vehicle.

22 Claims, 4 Drawing Sheets

TOWING CONNECTOR

BACKGROUND OF THE INVENTION

1. Field of the Invention

The present invention is broadly concerned with electrical interface devices designed to be mounted upon a towing vehicle so as to facilitate the electrical connection between the electrical systems of the towing vehicle and a towed vehicle. More particularly, the invention pertains to such interface devices which are designed to accommodate different types of towed vehicle electrical connectors, all without any modification of the interface device. In this fashion the interface devices of the invention may be used with towed vehicles having different types of electrical system connectors.

2. Description of the Prior Art

In recent years, the rising popularity of outdoor recreational activities, such as boating and camping, has led to an increase in the use of trailers, campers, boats and other towed vehicles. Many state and federal laws require that towed vehicles have on-board electrical systems for providing brake lights, turn signals and other safety features. These on-board electrical systems are usually controlled by the electrical system of the towing vehicle, to actuate appropriate electrical signals on the towed vehicle. For example, when the brake lights on the towing vehicle are energized, the brake lights on the towed vehicle are simultaneously energized. This is also true for the turn signals and backup lights of the two vehicles.

Typically, a hard-wired electrical connection is installed to enable slaving the responsive electrical system of the towed vehicle to the electrical signals generated by the towing vehicle. Hard-wired electrical connections typically include a plurality of mating plug and receptacle connections to enable the user to readily make and break the electrical connection. Commonly, each vehicle includes a wiring harness, to which the mating plug and receptacle connections are secured. Each wiring harness includes a harness connector with male and/or female terminals in a pin and/or blade configuration in order to establish a releasable electrical interconnection between the wiring harness on the towing vehicle and a wiring harness on the towed vehicle. The towed vehicle typically employs a wiring harness having an array of male or female pin terminals for releasable insertion into a complementary array of male or female pin terminals connected to the wiring harness on the towing vehicle.

Early wiring harnesses comprised relatively simple harness connectors having four terminals arranged in a spaced, linear arrangement, mounted in a flat harness component. Such early connectors were sufficient for handling low current requirements of simple electrical systems. However, with the proliferation of ever more sophisticated towed vehicles, equipped with many more complex accessories, electrical harness connectors having six or seven wires are becoming common on both towing and towed vehicles. Furthermore, such modern-day harness connectors are often of circular design in order to effectively accommodate the more numerous terminals required for the additional wires.

U.S. Pat. No. 5,443,389 describes a unified connector interface device wherein provision is made for a circular connector in the form of an appropriately configured socket-type receptacle. While this device is suitable for use with towed vehicles having such circular connectors, it does not provide for flat connectors without modification. That is, in the '389 patent, a cable with a flat coupler is normally plugged into the rear of the interface device in order to afford the proper electrical connection thereto. However, with a towed vehicle having a flat plug connector, it is necessary to detach this flat coupler and use it directly with the flat connector. This is not only troublesome, but also results in a condition where the attached electrical connectors of the towing and towed vehicles are in a suspended, exposed position where separation of and/or damage to the connectors can more readily occur.

SUMMARY OF THE INVENTION

The present invention overcomes the problems outlined above, and provides an improved electrical interface device designed for quick, easy connection between the electrical system of a towing vehicle and that of a plurality of differently configured towed vehicles, without any modification whatsoever of the interface device. In a preferred first embodiment, the interface device broadly comprises a body for mounting on the towing vehicle, the body having first and second ends; the first end presenting both a circular receptacle and a second linear or flat receptacle, with each of the receptacles including individual electrical terminals. The circular and flat receptacles are adapted to receive corresponding complemental electrical connectors forming a part of the electrical system of a respective towed vehicle. An electrical lead assembly is operatively coupled with the individual terminals and has a plurality of leads connectable to the electrical system of the towing vehicle. The lead assembly and terminals are coupled such that a complemental towed vehicle electrical connector attached to either of the receptacles will interconnect the electrical systems of the towing and towed vehicles.

In preferred forms, the circular receptacle is of the conventional variety and includes a central terminal as well as six circularly arranged terminals disposed about the central terminal. Of course, other terminal designs and/or terminal arrangements could also be provided. For example, a conventional adaptor can convert a conventional seven-round connector to a six-round connector. The flat receptacle is likewise preferably of conventional design and includes four linearly aligned terminals, three of such terminals being female while the remaining terminal is a male terminal. Advantageously, there are electrical wires coupling the terminals of the flat receptacle with certain of the terminals of the circular receptacle. Preferably, the shared electrical connections are connected in parallel.

In order to provide weather protection, the interface device has individually operable covers associated with the circular and flat receptacles, respectively. These individual covers are hingedly mounted to the main body of the device, and can be separately opened to allow access to the corresponding receptacle.

In a preferred second or alternative embodiment, the device is adapted for disengageable or removable coupling with an existing master connector substantially non-removably mounted on the towing vehicle in order to allow for the connection of the electrical systems of differently configured towed vehicles without any modification of the device. Broadly, the device comprises a first end presenting a first master connector and a second master connector, and a second end presenting a third interface connector. An alignment mechanism ensures proper alignment, and a locking mechanism avoids inadvertent uncoupling of the device from the existing master connector. In use, the second end of the device is coupled with the existing master connector, and

The drawing figures do not limit the present invention to the specific embodiments disclosed and described herein. The drawings are not necessarily to scale, emphasis instead being placed upon clearly illustrating the principles of the invention.

DETAILED DESCRIPTION OF A PREFERRED EMBODIMENT

Figure 1:
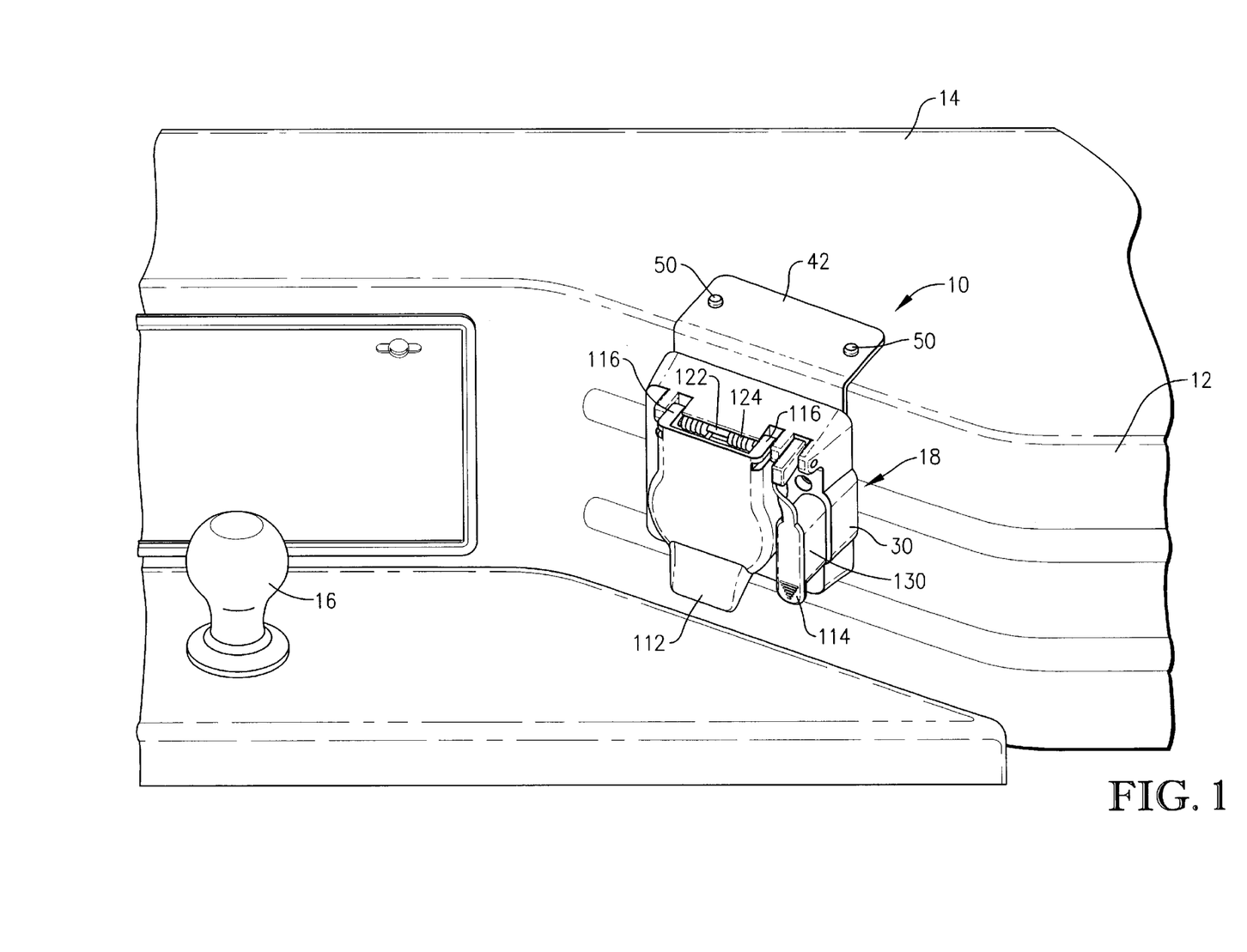
FIG. 1 is an elevational view of a preferred first embodiment of an electrical interface device, mounted upon the bumper of a towing vehicle.

Turning now to the drawings, FIG. 1 illustrates a preferred first embodiment of an electrical interface device 10 mounted on the bumper 12 of a towing vehicle 14, the latter equipped with a conventional hitch 16. This first embodiment is the subject of U.S. Pat. No. 6,447,302, titled "Towing Connector", issued Sep. 10, 2002. The purpose of the device 10 is to provide an appropriate electrical connection between the electrical system of the vehicle 14 and that of a towed vehicle such as a boat or travel trailer. A particular feature of the device 10 is the ability to accept a plurality of different connectors associated with the electrical systems of different types of towed vehicles, without modification of the device 10. In this way, a user may use the device 10 for electrically connecting the systems of divergent towed vehicles.

It should be noted that the present invention is for the electrical interface device 10 independent of any particular mounting location, arrangement, or means. Thus, the device 10 may be alternatively mounted under the bumper 12, through the bumper 12, on a hitch crossbar (not shown), on or through a rear body portion of the towing vehicle 14, or any other suitable location using any practical mounting means.

The device 10 broadly includes a receptacle body 18 having first and second ends 18a and 18b and adapted to be mounted on the vehicle 14 at any convenient location such as illustrated in FIG. 1, together with an electrical lead assembly 20 which is designed for connection to the electrical system of the towing vehicle 14. The body 18 has a circular receptacle 22 as well as a flat receptacle 24 on the face thereof.

In more detail, the body 18 includes a front segment 26 formed of synthetic resin material and presenting a face plate 28 and a continuous, circumscribing, rearwardly extending sidewall 30. The segment 26 also has a rearwardly extending socket 32 having a pair of spaced apart, elongated, rearwardly extending ribs 34, 36 on the exterior surface thereof. In addition, a series of four annular screw-receiving bosses 38 extend rearwardly from the face plate 28. Finally, the face plate 28 has an elongated, generally oval-shaped opening 40 therein, located astride the socket 32.

Figures 5, 6:
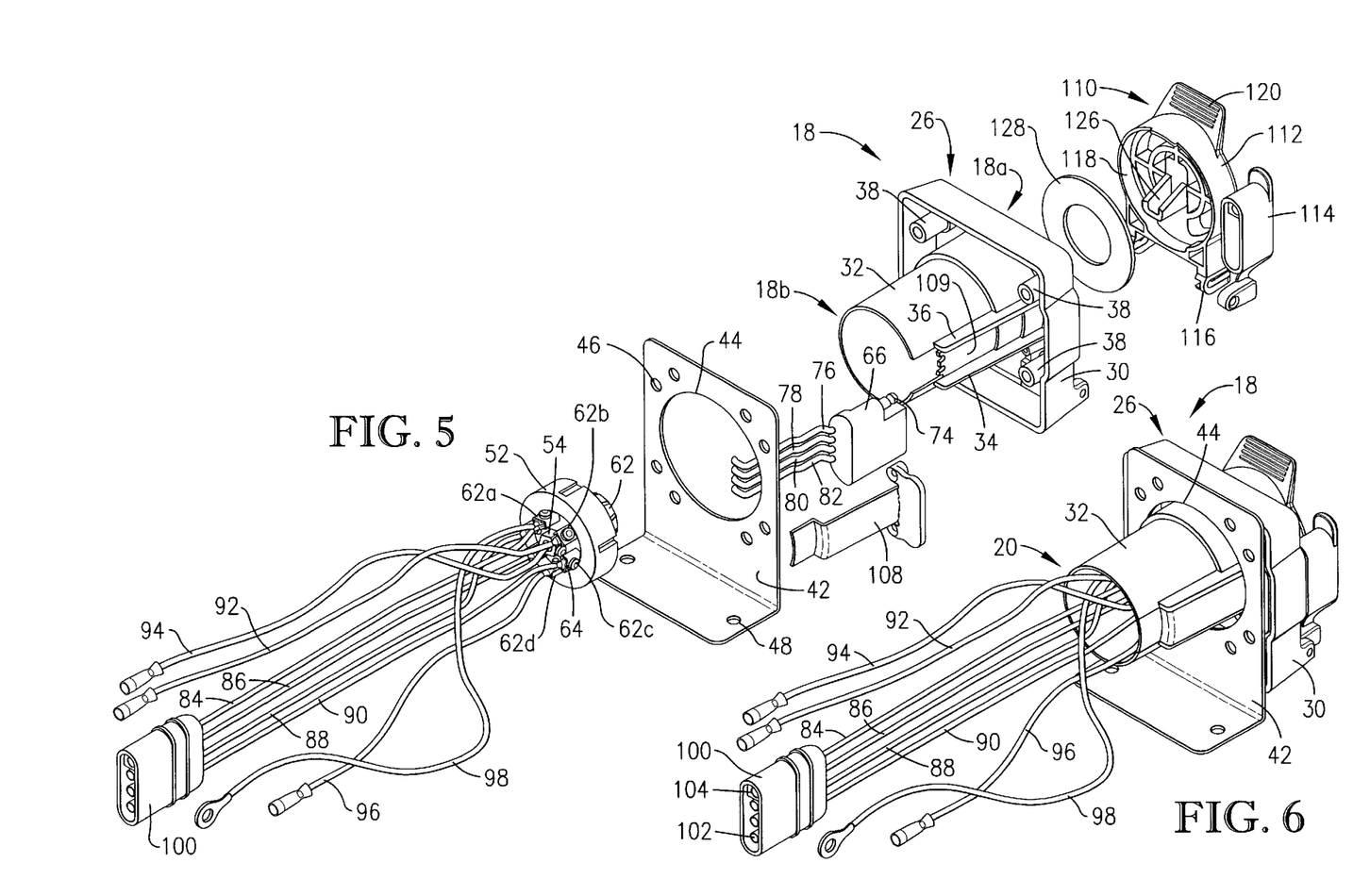
FIG. 5 is an exploded perspective view of the preferred first embodiment of the electrical interface device, illustrating the components thereof.
FIG. 6 is a perspective view of the completed preferred first embodiment of the electrical interface device, viewed from the rear thereof.

The body 18 also has a generally L-shaped apertured metallic mounting plate 42 secured to the rear face of segment 26. As best seen in FIGS. 5 and 6, the plate 42 has a large central opening 44 therein as well as additional fastener-receiving openings 46. The plate 42 is thus secured to segment 26 by screws received within bosses 38, with the rearwardly extending portion of socket 32 passing through opening 44. As best seen in FIG. 1, the transverse leg of plate 42 has openings 48 therein to accept mounting screws 50.

Figures 2, 3, 4:
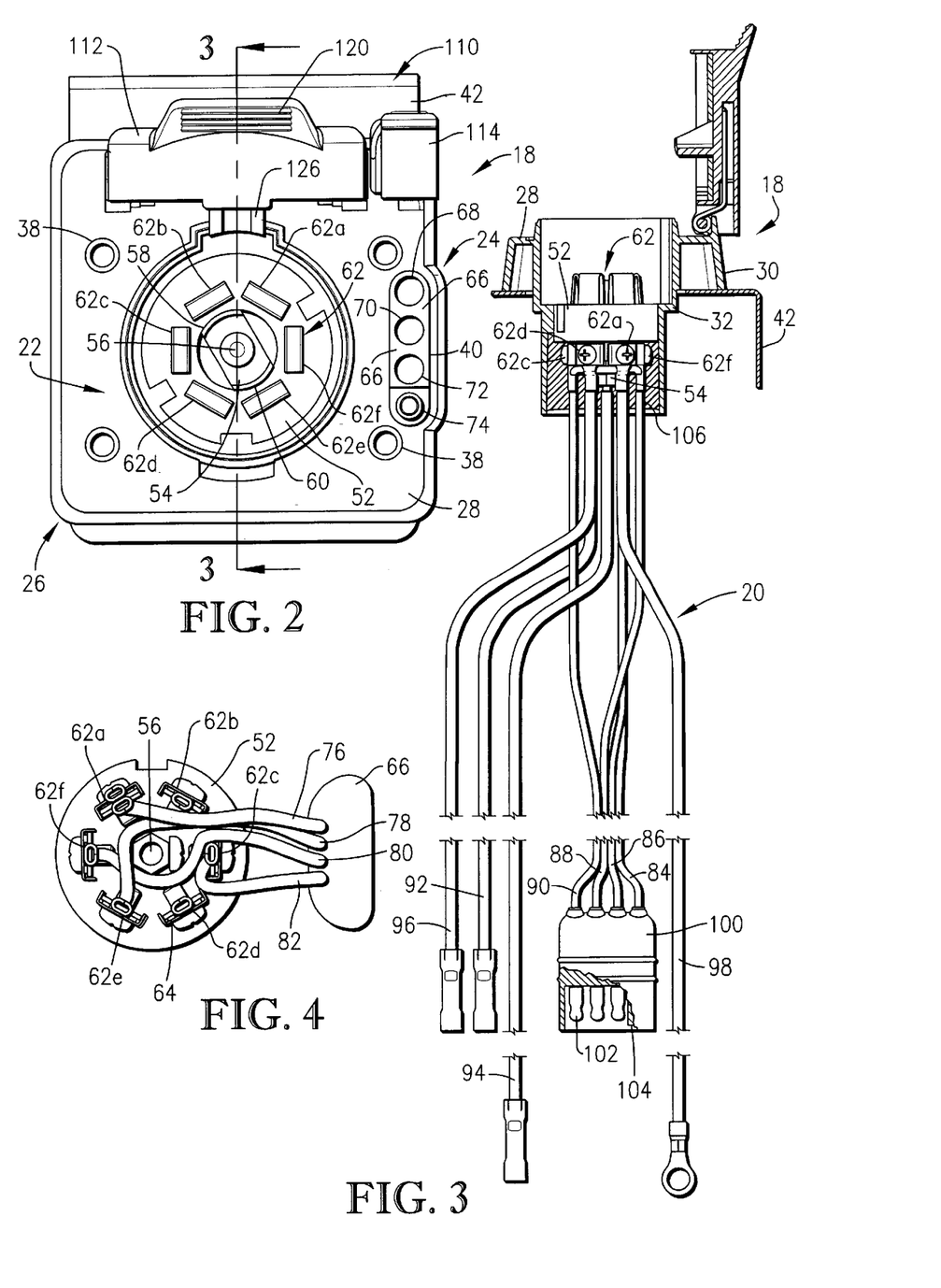
FIG. 2 is a front elevational view of the preferred first embodiment of the electrical interface device, with the individual covers thereof open to reveal the alternate receptacles.
FIG. 3 is a sectional view taken along line 3—3 of FIG. 2 and depicting details of the internal construction of the preferred first embodiment of the electrical interface device.
FIG. 4 is a fragmentary view illustrating the rear face of the circular receptacle of the preferred first embodiment of the electrical interface device, and depicting the electrical interconnection of the flat and circular receptacles.

The circular receptacle 22 includes a synthetic resin, circular terminal member 52 which is received within socket 32. The member 52 has a central terminal 54 secured in place by a fastener 56 and presenting a pair of arcuate, opposed, forwardly extending terminal legs 58, 60. In addition, the receptacle member 52 has a total of six generally U-shaped in cross-section spade-type terminals 62 which are circularly arranged about central terminal 54, labeled terminals 62a–62f. As illustrated in FIG. 4, each of the terminals 62 has a screw connector 64 on the rear face of member 52.

The flat receptacle 24 is in the form of a molded synthetic resin body 66 which is designed to fit within oval-shaped opening 40 provided in face plate 28. The body 66 includes three aligned openings 68, 70 and 72 having conventional electrical terminals (not shown), in the base thereof. Also, the body supports an elongated metallic male terminal 74 adjacent opening 62.

The lead assembly 20 includes four color-coded electrical leads 76, 78, 80 and 82 respectively electrically coupled with the terminals associated with each of the openings 68–72, and with male terminal 74. As shown in FIG. 5, these leads 76–82 are molded into body 66 and extend rearwardly therefrom. The lead assembly 20 also has a total of eight additional color-coded electrical leads 84, 86, 88, 90, 92, 94, 96 and 98 which are connected to the terminals 54 and 62 of member 52.

The electrical connections of device 10 can best be understood from a consideration of FIGS. 3–5. In particular, it will be seen that the leads 76–82 of flat receptacle 24 are connected to respective ones of the circular member terminals 62, i.e., leads 76 is connected to terminal 62a, lead 78 is connected to terminal 62e, lead 80 is connected to terminal 62f and lead 82 is connected to terminal 62c. In like manner, the leads 84–90 are also connected to these same terminals. The ends of the leads 84–90 remote from member 92 are connected to a coupler 100 which is a mate for flat receptacle 24, i.e., it has three male terminals 102 and a female terminal 104 in aligned condition.

The four remaining leads 92–98 are also coupled to member 52, with leads 92–96 secured to terminal connectors associated with the central terminal 54 (lead 94) and terminals 62b and 62d (leads 92 and 96 respectively); the lead 98 is a ground wire and is connected to the terminal connector associated with terminal 62a (see FIG. 5).

In the construction of device 10, the terminal member 52 is located within socket 32 in a recessed condition best illustrated in FIG. 5, with the leads all of assembly 20 extending rearwardly therefrom. An epoxy fill 106 is used to permanently secure and the member 52 within the socket 32, and to seal and weatherproof the connection. Also, the body 66 of flat receptacle 24 is secured to the front segment 26 by means of retainer plate 108 which is secured by fasteners (not shown) to the rear face of segment 26 adjacent opening 40. As shown, the plate 108 extends rearwardly and overlies the ribs 36 and 38, thereby forming a cable way 109 for the leads 76–82 extending from the body 66. The mounting plate 42 is then secured to front segment 26 by means of conventional screw fasteners.

Referring to FIGS. 1 and 5, it will also be observed that the front segment 26 supports the cover-up assembly 110, the latter including a circular receptacle cover 112 and a separate flat receptacle cover 114. The cover 112 includes a pair of laterally spaced apart slotted legs 116, a circular main body portion 118, and a projecting gripper 120. The cover 112 is pivotally supported on segment 26 by means of a metallic hinge pin 122 extending through the legs 116. A torsion spring 124 mounted on the pin 122 bias the cover 112 to its closed position. Referring to FIG. 5, it will be seen that the inner face of cover portion 118 includes an inwardly projecting keeper 126. Also, a resilient elastomeric sealing ring 128 is affixed to the inner surface of portion 118 to provide a weatherproof seal for circular receptacle 22. The flat receptacle cover 114 is formed of a resilient synthetic resin material and has a cap 130 designed to fit over the outwardly projecting body 66. In addition, a flexible connecting tail 132 extends from the cap 130 and is likewise pivotally supported on the pin 122.

In the use of device 10, the unit is first secured in place on a towing vehicle 14 by means of the fasteners 50 at a convenient location, such as on bumper 12. Next, the device is connected to the electrical system of the vehicle 14. This involves securing the coupler 100 to a mating connector forming a part of the electrical system, and then connecting the remaining leads 92–98 to appropriate locations within the electrical system. It will be understood in this respect that most modern-day towing vehicles are designed to accept the coupler 100 and have corresponding wires for connection of the remaining leads. That is, and considering the leads 84–90, the lead 84 is normally a ground wire, whereas leads 86–90 are respectively associated with the tail lights (lead 86) and the left and right turn signals (leads 88 and 90, respectively). As indicated previously, lead 98 is a ground wire. The remaining three leads 92–96 are each associated with back up lights and operation (lead 92), brakes on the towed vehicle (lead 94) and battery (lead 96). In this way, the device 10 is properly integrated into the electrical system of the vehicle 14.

When it is desired to tow a vehicle, the electrical system of the towed vehicle is connected to that of the vehicle 14 through the interface device 10. If the towed vehicle is equipped with a circular connector, cover 112 is opened and the connector is inserted into the circular receptacle 22. In this condition, the keeper 126 serves to retain the circular connector in place. Alternately, if the towed vehicle has a flat connector, the cover 114 is opened and the flat connector is inserted into the corresponding flat receptacle 24. In either case connection in this manner serves to properly electrically interconnect the electrical systems of the two vehicles, without any modification of the interface device 10.

Referring now to FIGS. 7–10, a preferred second or alternative embodiment of the electrical interface device 210 is shown as being substantially similar in form and function to the above-described preferred first embodiment but for the following differences. Thus, the purpose of the device 210 is to provide an appropriate electrical connection between the electrical system of the towing vehicle 14 and that of a towed vehicle such as a boat or travel trailer. A particular feature of the device 210 is the ability to accept a plurality of different connectors associated with the electrical systems of different types of towed vehicles, without modification of the device 210. In this way, a user may use the device 10 for electrically connecting the systems of divergent towed vehicles.

In contrast to the preferred first embodiment of the device 10, which is securely mounted to the towing vehicle 14 and substantially non-removably connected to the electrical system of the towing vehicle 14, the preferred second embodiment of the device 210 is adapted so as to couple or connect with an existing master connector in a substantially disengagable or removable manner, wherein the existing master connector is securely mounted to the towing vehicle and securely connected to the electrical system of the towing vehicle. It should be noted, however, that the present invention is for the device 210 substantially independent of the existing master connector or its mounting location, arrangement, or means. As discussed in more detail below, the device 210, being coupleable with or uncoupleable from the existing master connector, advantageously allows for quickly, conveniently, and easily facilitating connection of the electrical system of the towed vehicle with that of the towing vehicle in cases where the electrical connector of the towed vehicle does not correspond to and cannot otherwise be coupled with the existing master connector.

The preferred second embodiment of the device 210 broadly comprises a receptacle body 218 having first and second ends 218a and 218b, with the first end 218a providing both the first or circular master connector 222 and the second or flat master connector 224 on the face thereof, and the second end 218b providing a third interface connector 225 adapted to cooperate with the existing master connector so as to electrically connect the first and second master connectors 222,224 with the electrical system of the towing vehicle in a substantially disengagable or removable manner. The device 210 also includes an alignment mechanism 229 and a releasable locking mechanism 231.

Figure 7:
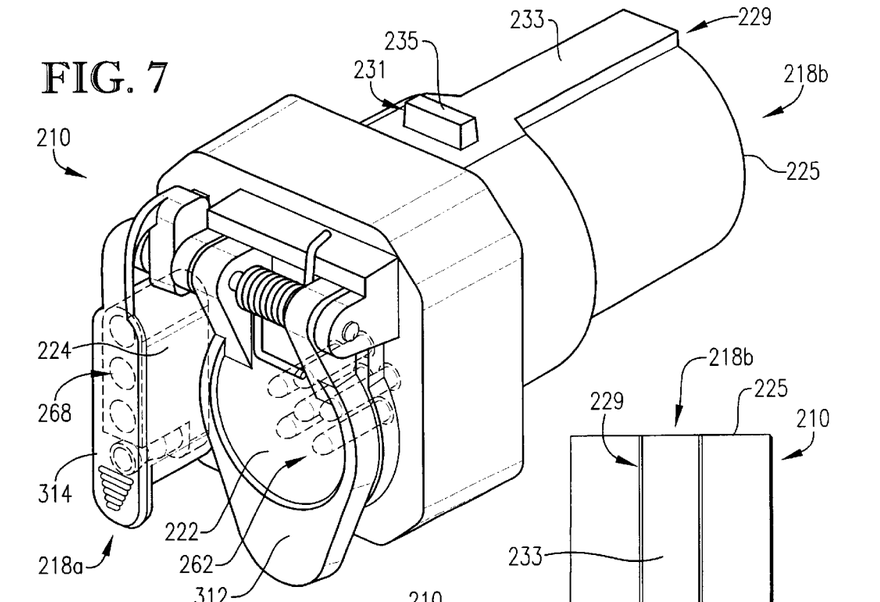
FIG. 7 is an isometric view of a preferred second or alternative embodiment of the electrical interface device, with otherwise hidden electrical terminals thereof shown in broken line.
Figures 8, 9, 10:
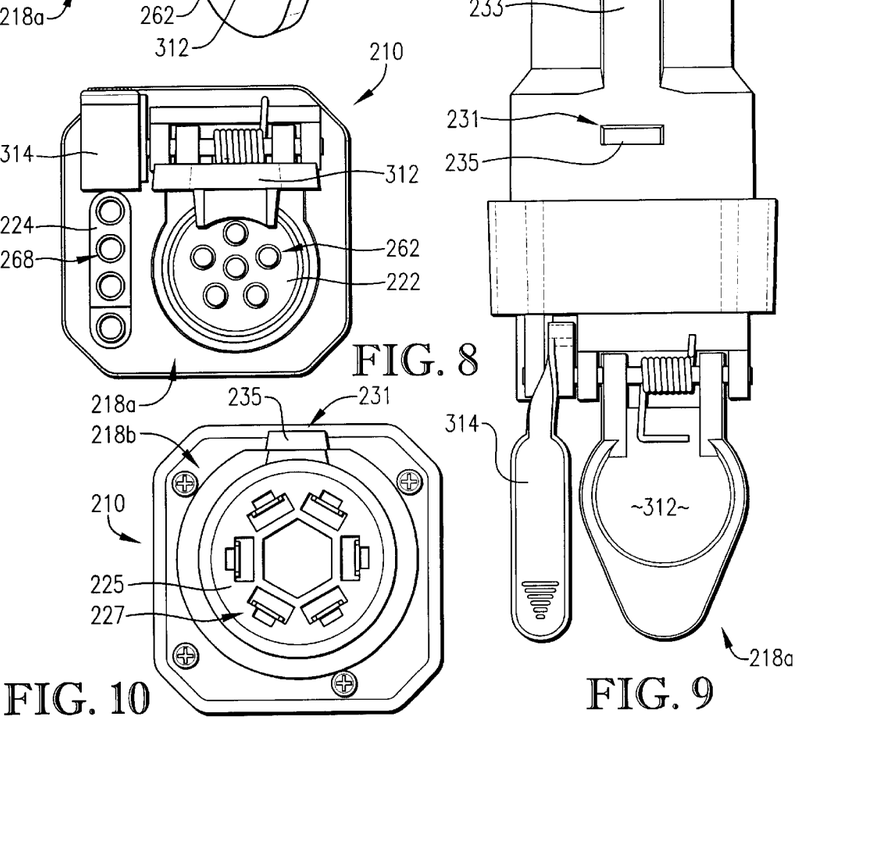
FIG. 8 is a front elevational view of the preferred second embodiment of the electrical interface device, with the individual covers thereof open to reveal the alternate receptacles.
FIG. 9 is a rear elevational view of the preferred second embodiment of the electrical interface device.
FIG. 10 is a plan view of the preferred second embodiment of the electrical interface device, with the individual covers thereof open in order to illustrate operation.

The first and second master connectors 222,224 are substantially similar in both form and function to the circular and flat receptacles 22,24 of the preferred first embodiment, each being of a type that is male, female, or a combination thereof in nature, and having a plurality of first electrical terminals 262 and a plurality of second electrical terminals 268, respectively. As best seen in FIGS. 7 and 8, the plurality of first electrical terminals 262 of the first master connector 222 are substantially cylindrical, which contrasts with the substantially flat or blade-type terminals 62, shown in FIG. 2, of the preferred first embodiment of the device 10. The present invention, however, is independent of either of these terminal types, cylindrical or flat. The first and second covers 312,314 selectively cover the first and second master connectors 222,224, respectively, when not in use.

The third interface connector 225 includes a plurality of third electrical terminals 227 adapted to cooperate with a plurality of existing master electrical terminals presented by the existing master connector, and, in so doing, to connect the first and second connectors 222,224 with the master electrical system of the towing vehicle. It should be noted that though the interface connector 225 is shown as being substantially cylindrical in form and the plurality of third electrical terminals 227 are shown as being female flat or blade-type terminals, neither is limited thereto. However, in order for the interface connector 225 to properly cooperate with the existing master connector, they and their associated electrical terminals must be of corresponding or complementary form and function.

The alignment mechanism 229 substantially ensures proper alignment when coupling the second end 218*b* with the existing master connector, thereby substantially preventing or avoiding misconnection or damage to the various electrical terminals. This feature is particularly relevant to the preferred second embodiment of the device 210 in light of its disengagable or removable nature. As best seen in FIGS. 7 and 9, the alignment mechanism 229 is preferably a key-type mechanism, with the second end 218*b* including a male or female first portion 233 of the key-type mechanism adapted to cooperate with a corresponding and complementary female or male second portion of the key-type mechanism provided by the existing master connector. Alternatively, a different type of alignment mechanism or a key-type alignment mechanism of differing form but similar function could be used to ensure proper alignment.

The releasable locking mechanism 231 substantially prevents accidental or otherwise inadvertent uncoupling of the second end 218*b* from the existing master connector. This feature is particularly relevant to the preferred second embodiment of the device 210 in light of its disengagable or removable nature. As best seen in FIGS. 7, 8, and 9, the locking mechanism 231 is preferably a stop-type mechanism, with the second 218*b* end including a male or female first portion 235 of the stop-type mechanism adapted to releasably cooperate with a corresponding and complementary female or male second portion of the stop-type mechanism provided by the existing master connector. Alternatively, a different type of locking mechanism a stop-type mechanism of differing form but similar function could be used to prevent accidental or otherwise inadvertent uncoupling. Thus, for example, where the existing master connector includes a cover that is substantially similar to the circular receptacle cover 112 of the preferred first embodiment described above, an inwardly projecting keeper of the inner face of the cover could provide the second portion of the stop-type mechanism such that any attempt to remove the device 210 from the existing master connector without first lifting the cover of the existing master connector would cause the first portion 235 of the stop-type mechanism to contact the keeper and thereby prevent further movement.

In the use of device 210, a user first determines that the interface connector 225 and its electrical terminals 227 of the second end 218*b* of the device 210 correspond to or complement the existing master connector secured to the towing vehicle. The device 210 is then removably coupled with the existing master connector, thereby quickly, conveniently and easily accommodating the towed vehicle. This is most likely accomplished: by properly aligning the alignment mechanism 229 and pushing or plugging the interface connector 225 of the second end 218*b* of the device 210 into or onto the existing master connector until the locking mechanism 231 engages, thereby ensuring a proper and secure connection. Removal of the device 210 is accomplished by disengaging the locking mechanism 231 and then pulling or withdrawing the interface connector 225 from the existing master connector.

Although the invention has been described with reference to the preferred embodiment illustrated in the attached drawing figures, it is noted that equivalents may be employed and substitutions made herein without departing from the scope of the invention as recited in the claims. For example, as noted above, the electrical interface device 10 is independent of any particular mounting location, arrangement, or means and is not limited to the particular mounting described and shown in detail herein.

Having thus described the preferred embodiment of the invention, what is claimed as new and desired to be protected by Letters Patent includes the following:

1. An electrical interface device for connecting a master electrical system of a towing vehicle to a slave electrical system of a towed vehicle, wherein the towing vehicle presents an existing master connector which is connected to master electrical system and the slave electrical system includes one of a plurality of different types of slave connectors, the electrical interface device comprising:
   a first end including
      a first master connector incorporated into the first end and operable to detachably couple with a first type of slave connector, and
      a second master connector incorporated into the first end and operable to detachably couple with a second type of slave connector; and
   a second end having an interface connector body adapted to removably couple with a housing of the existing master connector and thereby electrically connect the first master connector and the second master connector to the master electrical system.

2. The electrical interface device as set forth in claim 1, wherein the first master connector is substantially circular and includes a plurality of first electrical terminals arranged substantially non-linearly.

3. The electrical interface device as set forth in claim 1, wherein the second master connector is substantially flat and includes a plurality of second electrical terminals arranged substantially linearly.

4. The electrical interface device as set forth in claim 1, further including a first cover adapted to selectively cover the first master connector, and a second cover adapted to selectively cover the second master connector.

5. The electrical interface device as set forth in claim 1, wherein the interface connector body includes a substantially cylindrical interface connector including a plurality of third electrical terminals adapted to cooperate with a plurality of existing master electrical terminals presented by the existing master connector.

6. The electrical interface device as set forth in claim 1, further including an alignment mechanism adapted to ensure proper alignment when coupling the second end with the existing master connector.

7. The electrical interface device as set forth in claim 6, wherein the alignment mechanism is a key-type mechanism, with the second end including a first portion of the key-type mechanism adapted to cooperate with a second portion of the key-type mechanism provided by the existing master connector.

8. The electrical interface device as set forth in claim 1, further including a releasable locking mechanism adapted to prevent inadvertent uncoupling of the second end of the electrical interface device from the existing master connector.

9. The electrical interface device as set forth in claim 8, wherein the releasable locking mechanism is a stop-type mechanism, with the electrical interface device including a first portion of the stop-type mechanism adapted to cooperate with a second portion of the stop-type mechanism provided by the existing master connector.

10. An electrical interface device for connecting a master electrical system of a towing vehicle to a slave electrical system of a towed vehicle, wherein the towing vehicle presents an existing master connector which is connected to the master electrical system and the slave electrical system includes one of a plurality of different types of slave connectors, the electrical interface device comprising:
a first end including
a first master connector incorporated into the first end and operable to detachably couple with a first type of slave connector of the plurality of different types of slave connectors, and
a second master connector incorporated into the first end and operable to detachably couple with a second type of slave connector of the plurality of different types of slave connectors;
a second end adapted to removably couple with the existing master connector and thereby electrically connect the first master connector and the second master connector to the master electrical system;
an alignment mechanism associated with the second end and adapted to ensure proper alignment when coupling the second end with the existing master connector; and
a releasable locking mechanism adapted to prevent inadvertent uncoupling of the second end from the existing master connector.

11. The electrical interface device as set forth in claim 10, wherein the first master connector is substantially circular and includes a plurality of first electrical terminals arranged substantially non-linearly.

12. The electrical interface device as set forth in claim 10, wherein the second master connector is substantially flat and includes a plurality of second electrical terminals arranged substantially linearly.

13. The electrical interface device as set forth in claim 10, further including a first cover adapted to selectively cover the first master connector, and a second cover adapted to selectively cover the second master electrical connector.

14. The electrical interface device as set forth in claim 10, wherein the second end includes a substantially cylindrical interface connector including a plurality of third electrical terminals adapted to cooperate with a plurality of existing master electrical terminals presented by the existing master connector.

15. The electrical interface device as set forth in claim 10, wherein the alignment mechanism is a key-type mechanism, with the second end including a first portion of the key-type mechanism adapted to cooperate with a second portion of the key-type mechanism provided by the existing master connector.

16. The electrical interface device as set forth in claim 10, wherein the releasable locking mechanism is a stop-type mechanism, with the electrical interface device including a first portion of the stop-type mechanism adapted to cooperate with a second portion of the stop-type mechanism provided by the existing master connector.

17. An electrical interface device for connecting a master electrical system of a towing vehicle to a slave electrical system of a towed vehicle, wherein the towing vehicle presents an existing master connector which is interfaced with the master electrical system and the slave electrical system includes one of a plurality of different types of slave connectors, the electrical interface device comprising:
a first end including
a first master connector incorporated into the first end, being substantially circular and including a plurality of first electrical terminals arranged substantially non-linearly, and operable to detachably couple with a first type of slave connector of the plurality of different types of slave connectors,
a first cover adapted to selectively cover the first master connector,
a second master connector incorporated into the first end, being substantially flat and including a plurality of second electrical terminals arranged substantially linearly, and operable to detachably couple with a second type of slave connector of the plurality of different types of slave connectors, and a second cover adapted to selectively cover the second master electrical connector; and
a second end having an interface connector body adapted to removably couple with a housing of the existing master connector and thereby electrically connect the first master connector and the second master connector to the master electrical system.

18. The electrical interface device as set forth in claim 17, wherein the interface connector body includes a substantially cylindrical interface connector including a plurality of third electrical terminals adapted to cooperate with a plurality of existing master electrical terminals presented by the existing master connector.

19. The electrical interface device as set forth in claim 17, further including an alignment mechanism adapted to ensure proper alignment when coupling the second end with the existing master connector.

20. The electrical interface device as set forth in claim 19, wherein the alignment mechanism is a key-type mechanism, with the second end including a first portion of the key-type mechanism adapted to cooperate with a second portion of the key-type mechanism provided by the existing master connector.

21. The electrical interface device as set forth in claim 17, further including a releasable locking mechanism adapted to prevent inadvertent uncoupling of the second end of the electrical interface device from the existing master connector.

22. The electrical interface device as set forth in claim 21, wherein the releasable locking mechanism is a stop-type mechanism, with the electrical interface device including a first portion of the stop-type mechanism adapted to cooperate with a second portion of the stop-type mechanism provided by the existing master connector.

\* \* \* \* \*

UNITED STATES PATENT AND TRADEMARK OFFICE
CERTIFICATE OF CORRECTION

PATENT NO. : 6,749,438 B1
DATED : June 15, 2004
INVENTOR(S) : Scheller et al.

It is certified that error appears in the above-identified patent and that said Letters Patent is hereby corrected as shown below:

Column 8,
Lines 21-39, Claim 1 should be replaced with the following claim:
    1. An electrical interface device for connecting a master electrical system of a towing vehicle to a slave electrical system of a towed vehicle, wherein the towing vehicle presents an existing master connector which is connected to master electrical system and the slave electrical system includes one of a plurality of different types of slave connectors, the electrical interface device comprising:
      a first end including-
        a first master connector incorporated into the first end and operable to
          detachably couple with a first type of slave connector,
        a first cover adapted to selectively cover the first master connector,
        a second master connector incorporated into the first end and operable to
          detachably couple with a second type of slave connector, and
        a second cover adapted to selectively cover the second master connector; and
      a second end having an interface connector body adapted to removably couple with
        a housing of the existing master connector and thereby electrically connect
        the first master connector and the second master connector to the master
        electrical system.
Lines 48-51, Claim 4 has been canceled and should be deleted from the specification.

Column 9,
Lines 12-38, Claim 10 should be replaced with the following claim:
  10. An electrical interface device for connecting a master electrical system of a towing vehicle to a slave electrical system of a towed vehicle, wherein the towing vehicle presents an existing master connector which is connected to the master electrical system and the slave electrical system includes one of a plurality of different types of slave connectors, the electrical interface device comprising:
a first end including
      a first master connector incorporated into the first end and operable to detachably
        couple with a first type of slave connector of the pluality of different types
        of slave connectors,
      a first cover adapted to selectively cover the first master connector,
      a second master connector incorporated into the first end and operable to
        detachably couple with a second type of slave connector of the plurality of
        different types of slave connectors, and
      a second cover adapted to selectively cover the second master connector; a
second end adapted to removably couple with the existing master connector and thereby
    electrically connect the first master connector and the second master connector to
    the master electrical system;

UNITED STATES PATENT AND TRADEMARK OFFICE
CERTIFICATE OF CORRECTION

PATENT NO. : 6,749,438 B1
DATED : June 15, 2004
INVENTOR(S) : Scheller et al.

It is certified that error appears in the above-identified patent and that said Letters Patent is hereby corrected as shown below:

Column 9 (cont'd),
an alignment mechanism associated with the second end and adapted to ensure proper alignment when coupling the second end with the existing master connector; and
a releasable locking mechanism adapted to prevent inadvertent uncoupling of the second end from the existing master connector.
Lines 47-50, Claim 13 has been canceled and should be deleted from the specification.

Signed and Sealed this

Thirteenth Day of December, 2005

JON W. DUDAS
*Director of the United States Patent and Trademark Office*